United States Patent
Rokugo et al.

(10) Patent No.: US 6,934,291 B1
(45) Date of Patent: Aug. 23, 2005

(54) ATM NETWORK SYSTEM AND METHOD FOR ALLOCATING VPI FOR USER DEVICES

(75) Inventors: Yoshinori Rokugo, Tokyo (JP); Hiroyuki Kikuchi, Miyagi (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/506,366

(22) Filed: Feb. 18, 2000

(30) Foreign Application Priority Data

Feb. 25, 1999 (JP) .......................................... 11-048165

(51) Int. Cl.$^7$ .......................... H04L 12/28; H04L 12/56
(52) U.S. Cl. ..................... 370/395.3; 370/400; 370/410
(58) Field of Search .............................. 370/395.3, 399, 370/400, 410, 398, 397, 409, 395.1, 395.2, 396

(56) References Cited

U.S. PATENT DOCUMENTS

| | | | | |
|---|---|---|---|---|
| 5,339,318 A | * | 8/1994 | Tanaka et al. | 370/399 |
| 5,440,547 A | * | 8/1995 | Easki et al. | 370/395.3 |
| 5,483,525 A | | 1/1996 | Song et al. | 370/60 |
| 5,872,786 A | * | 2/1999 | Shobatake | 370/398 |
| 6,081,519 A | * | 6/2000 | Petler | 370/356 |
| 6,148,000 A | * | 11/2000 | Feldman et al. | 370/397 |
| 6,480,492 B1 | * | 11/2002 | Lundback et al. | 370/395.1 |
| 6,553,014 B1 | * | 4/2003 | Shobatake | 370/331 |

FOREIGN PATENT DOCUMENTS

| | | |
|---|---|---|
| JP | 5-122240 | 5/1993 |
| JP | 7-74767 | 3/1995 |
| JP | 7-212370 | 8/1995 |
| JP | 7--264207 | 10/1995 |
| JP | 8-186573 | 7/1996 |
| JP | 2702429 | 10/1997 |
| JP | 9-511111 | 11/1997 |
| JP | 10-229406 | 8/1998 |
| WO | WO 99/07179 | * 2/1999 |

OTHER PUBLICATIONS

Copy of official action in Chinese Patent Application 00105390.6.*

* cited by examiner

*Primary Examiner*—Seema S. Rao
*Assistant Examiner*—Inder Pal Mehra
(74) *Attorney, Agent, or Firm*—Harrity & Snyder, LLP

(57) ABSTRACT

To provide a method and network system, wherein the proper VPI values are allocated, after the user devices are connected with the network device. A user device transmits a first specific ATM cell, while a network device receives the first specific ATM cell and transmits toward the user device a second specific ATM cell which carries a proper VPI value in the information field of ATM cell. The proper VPI value in the second specific ATM cell is memorized and used by the user device for its own VPI value for communication.

17 Claims, 2 Drawing Sheets

| CH No. | VPI VALUE (LOWER 2 BITS) | FLAG |
|---|---|---|
| 1 | 00 | |
| | 01 | |
| | 10 | |
| | 11 | |
| 2 | ⋮ | ⋮ |
| ⋮ | ⋮ | ⋮ |

ATM NETWORK SYSTEM AND METHOD FOR ALLOCATING VPI FOR USER DEVICES

BACKGROUND OF THE INVENTION

1. Technical Field of the Invention

The present invention relates to a method for allocating VPI (Virtual Path Identifier) and an ATM (Asynchronous Transfer Mode) network system including a plurality of user devices connected with a network device.

2. Description of the Prior Art

It is necessary to allocate VPI values for both a network device and a plurality of user devices in order to transmit and receive ATM cells between them in an ATM network system, wherein the network device is connected with the user devices through network terminals (NIT).

Therefore, the VPI values for the user devices must be allocated, when the user devices are installed.

There is disclosed in JPA 8-186573 (1986) a VPI conversion system in ATM subscriber line terminal equipment, wherein the conversion circuits for individual communication interfaces are common. Concretely, 12 Bit data for NNI (Network Node Interface) is generated by adding 4 Bit GFC (Generic Flow Control) to 8 Bit VPI data.

There is also disclosed in JPA 7-74767 (1995) a connectionless service equipment, wherein the connectionless services are offered to the users in a network system which transmits cells by multiplexing a plurality of connections.

There is also disclosed in Japanese Patent No. 2702429 a VPI conversion system in ATM user terminal station equipment, wherein the conversion circuits for individual communication interfaces are common.

There is also disclosed in JPA 9-511111 (1997) of the translated version of PCTIGB 95/00696 a B-ISDN (Broadband Integrated Service Digital Network) access, wherein network ports through which the users gain accesses to the network system can be increased.

There is also disclosed in JPA 10-229406 (1998) an ATM signaling method, wherein signaling cells including signaling VPI/VCI are exchanged between user terminals and call control terminals.

SUMMARY OF THE INVENTION

An object of the present invention is to provide a method for allocating VPI for the user devices, when a network device is connected with a plurality of user devices. The method of the present invention makes it unnecessary to allocate the VPI before installing the user devices.

Another object of the present invention is to provide a network system, wherein the VPI for the user devices can be allocated, after connecting the user devices with the network device.

The present invention relates to an ATM network system and method for allocating the VPI for a plurality of user devices or customer premises equipment.

Therefore, the present invention is different from the invention disclosed in JPA 8-186573 (1986), wherein identical conversion circuits are used for individual communication interfaces. The present invention relates to the VPI allocation.

The present invention is different from the invention disclosed in JPA 7-74767 (1995), wherein connectionless services are offered to the users. The present invention relates to the VPI allocation.

The present invention is different from the invention disclosed in Japanese Patent No. 2702429, wherein identical conversion circuits are used for individual communication interfaces. The present invention relates to the VPI allocation.

The present invention is different from the invention disclosed in JPA 9-511111 (1997), wherein network ports for users are increased in a B-ISDN access network. The present invention relates to the VPI allocation.

The present invention is different from the invention disclosed in JPA 10-229406 (1998), wherein signaling cells including signaling VPI/VCI are exchanged between user terminals and call control terminals. The present invention relates to the VPI allocation.

The ATM network system of the present invention comprises a network device and a plurality of user devices. Here, the network device receives a first specific ATM cell, and transmits a second specific ATM cell which is loaded with a proper VPI value on an information field, while a user device transmits the first specific ATM cell, receives the second specific ATM cell, and holds the proper VPI.

The user device may include a confirmation means for transmitting a third specific ATM cell, after holding the proper VPI, and for receiving a fourth specific ATM cell, while the network device may include a confirmation response means for transmitting a fourth specific ATM cell in response to the third specific ATM cell.

Further, the user device may include an initialization means for initializing the proper VPI, wherein said initialization means transmits a fifth specific ATM cell, and receives a sixth specific ATM cell. while the network device may include a transmission means for transmitting the sixth specific ATM cell in response to the fifth specific ATM cell.

Further, the user device may include an initialization confirmation means for transmitting a seventh specific ATM cell, after initializing the proper VPI, and for receiving an eighth specific ATM cell, while the network device may include an initialization confirmation response means for transmitting the eighth specific ATM cell in response to the seventh specific ATM cell.

Furthermore, a number of the user devices connected with channels of the network device may be limited within a prescribed number. Further, the proper VPI is made different from each other within the same channel of the network device.

Furthermore, the transmission means of the network device may transmit in response to the fifth specific ATM cell the sixth specific ATM cell towards all of the user devices which are connected with a channel of the network.

Furthermore, the user device may transmit the first specific ATM cell, after completing a connection with the network device.

Furthermore, the specific ATM cell may have a specific VPI and VCI in a cell header.

The VPI allocation method of the present invention comprises the steps of: a first transmission step for transmitting a first specific ATM cell from a user device to the network device; a second transmission step for transmitting in response to the first specific ATM cell a second specific ATM cell loaded with a proper VPI in its information field, from the network device to the user device; and a holding step for holding the proper VPI in the user device, after receiving the second specific ATM cell.

Further, the VPI allocation method may include the steps of: a third transmission step for transmitting a third specific ATM cell for notifying an arrival of the proper VPI, from the user device to the network device; a fourth transmission step for transmitting a fourth specific ATM cell from the network device to the user device, in response to the third specific ATM cell; and a receiving step for receiving the fourth specific ATM cell at the user device.

Further, the VPI allocation method may include the steps of: a fifth transmission step for transmitting, from the user device to the network device, a fifth specific ATM cell for requesting an initialization of the proper VPI; a sixth transmission step for transmitting from the network device to the user device a sixth specific ATM cell for permitting the request, in response to the fifth specific ATM cell; and an initializing step for initializing the proper VPI held by the user device.

Further, the VPI allocation method may include the steps of: a seventh transmission step for transmitting a seven specific ATM cell for notifying an execution of the initialization, from the user device towards the network device, after the initializing step; an eighth transmission step for transmitting an eighth specific ATM cell from the network device to the user device, in response to the seventh specific ATM cell; and a receiving step for receiving the eighth specific ATM cell at the user cell.

Furthermore, in the VPI allocation method, the proper VPI is made different from each other within the same channel of the network device.

Furthermore, the VPI allocation method of the present invention may include the steps of: a fifth transmission step for transmitting a fifth specific ATM cell for requesting an initialization of the proper VPI, from the user device towards the network device; a sixth transmission step for transmitting a sixth specific ATM cell for permitting the request, from the network device to all of the user devices which are connected with a channel of the network; and an initializing step for initializing the proper VPI held by the user device.

Furthermore, in the VPI allocation method, the first specific ATM cell may be transmitted after completing a connection with the network device.

Furthermore, in the VPI allocation method, the specific ATM cell may have a specific VPI and a specific VCI in a cell header.

Furthermore, the VPI allocation method may include a step for connecting the network device and the user devices.

Furthermore, the VPI allocation method of the present invention may include a step for holding the VPI value in common.

Furthermore, the VPI allocation method may include a step for initializing the VPI once held in common by the network device and the user devices.

According to the present invention, it becomes unnecessary to prepare the proper VPI values in advance before installing the user devices. In the present invention, the proper VPI values are allocated, after the user devices are connected with the network device.

Further, according to the present invention, a network system is provided, wherein the proper VPI values can be allocated, after the user devices are connected with the network device.

PREFERRED EMBODIMENT OF THE INVENTION

Figure 1:
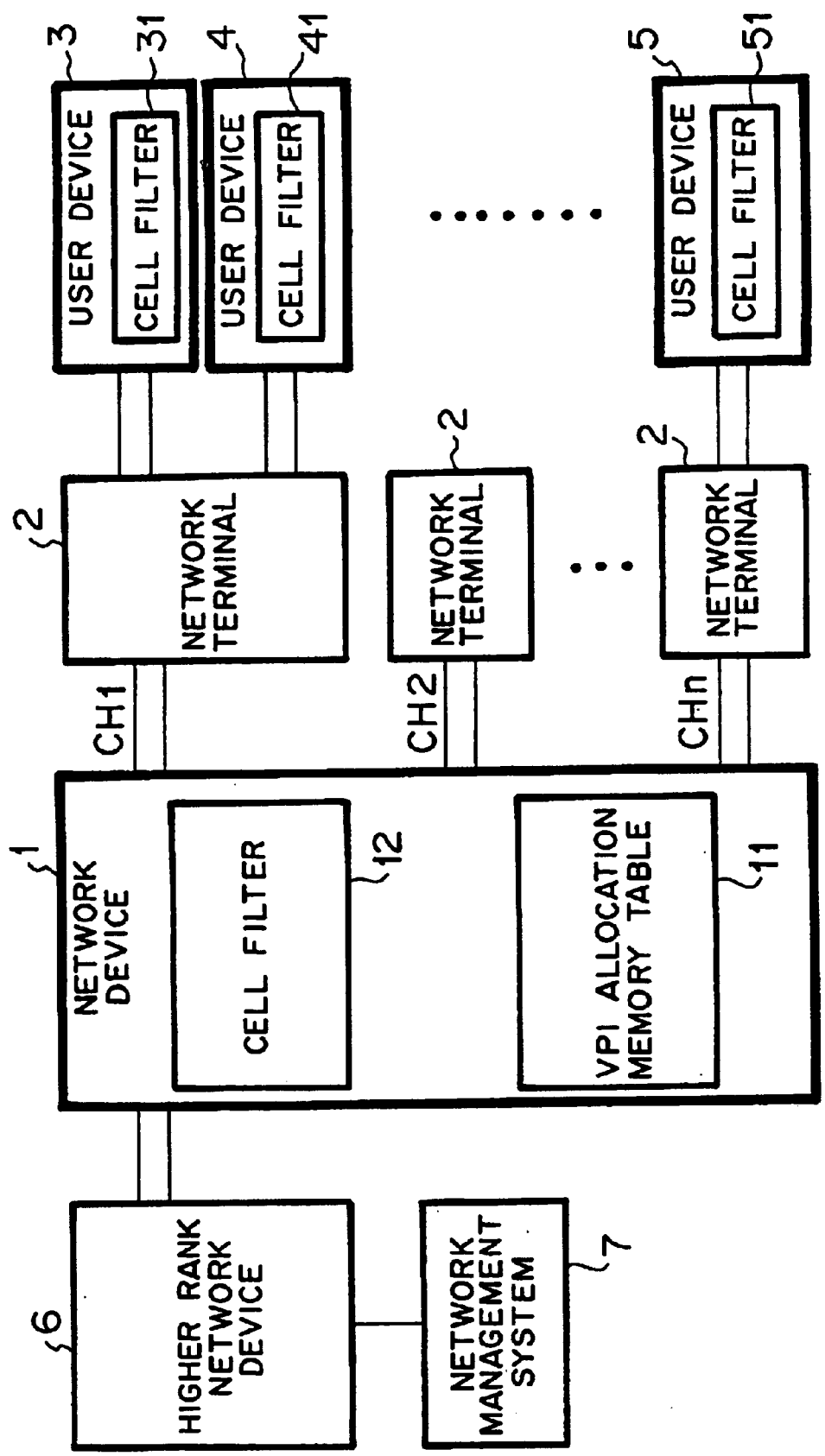
FIG. 1 is a block diagram of the network system of the present invention.

Modes of embodiment of the present invention are explained, referring to the drawings.

A block diagram of the network system of the present invention is shown in FIG. 1.

As shown in FIG. 1, the network system of the present invention comprises network device 1, a plurality of network terminals 2 (NT), a plurality of user devices 3, 4, and 5, higher rank network device 6, and network management system 7.

Network device 1 comprises VPI allocation memory table 11 and cell filter 12 which stores the VPI of user devices 3, 4, and 5. Network device 1 is connected with user device (1) 3, user device (2) 4, and user device (k) 5 through network terminals 2 (NT). Further, network device 1 is connected with higher rank network device 6.

Higher rank network device 6 manages all the VPI values allocated to the channels (CH) of network device 1.

Network management system 7 is connected to higher rank network device 6, in order to manage the whole network system. Concretely, network management system 7 manages the VPI of each port of higher rank network device 6.

User device (1) 3, user device (2) 4, and user device (k) 5 include cell filters 31, 41, and 51, respectively. Cell filters 31, 41, or 51 store the proper VPI which are allocated to user device (1) 3, user device (2) 4, and user device (k) 5.

User device 3, 4, or 5 as customer premises equipment must have its own Virtual Path (VP) identified by the VPI.

Here, network device 1 and user devices 3, 4, and 5 are explained, concerning the initial allocation of the VPI.

First, network device 1 is explained.

Network device 1 receives the specific ATM cells from user devices 3, 4, and 5. Here the specific ATM cell may have a specific VPI and a specific VCI in its header. Then, after loading a VPI value proper to each user device in the information field of each of the specific ATM cells, the network device 1 transmits the specific ATM cell including the proper VPI to each user device. The proper VPI is used as a communication VPI proper to user devices 3, 4, or 5.

Then, network device 1 memorizes the communication VPI values which are managed by a non-shown CPU and are recorded in cell filter 12.

VCI (Virtual Channel Identifier) is an identifier for identifying a point to point connection between a user device and another user device as well as for identifying a point to multi-point connection between a user device and a plurality of user devices.

Next, user devices 3, 4, and 5 are explained.

User device 3, 4, or 5 transmit toward network device 1 its request for the allocation of its own VPI values, by transmitting a specific ATM cell. This is for assuring the communication VPI proper to each of user device 3, 4, or 5.

In response to the requests, network device 1 transmits the proper VPI which are loaded on the information fields of ATM cell. Afterwards, the proper VPI values are kept by user devices 3, 4, and 5.

The proper VPI values allocated to user devices 3, 4, and 5 are managed by non-shown CPUs of user devices 3, 4, and 5, and are recorded in cell filters 31, 41, and 51.

After such allocation procedures, the allocations are confirmed by exchanging the ATM cells.

An example of the confirmation of the allocation procedure is explained hereinafter.

First, user device 3, 4, or 5 transmits toward network device 1 a specific ATM cell which contains data for confirming the arrival of the proper VPI.

Then, after receiving the ATM cell for the confirmation from user device 3, 4, or 5, network device 1 transmits toward user device 3, 4, or 5 a specific ATM cell which contains data for responding to the confirmation from user device 3, 4, or 5.

Next, release procedure of the proper VPI once allocated to user devices 3, 4, and 5 is explained.

First, user device 3, 4, or 5 requests to release the proper VPI value by transmitting toward network device 1 a specific ATM cell which contains data for requesting the release.

After receiving the ATM cells for the release request, network device 1 initializes the communication VPI stored in cell filter 12. Then, network device 1 transmits, toward the user device who requested the release, a specific ATM cell which contains in its information field other specific data for indicating that the release has been executed.

Further, after receiving the specific ATM cell which notifies the execution of release, the user device initializes its cell filter 31, 41, or 51.

The object of the initialization by network device 1 is not limited to the user device which requests the release of its proper VPI. The object of the initialization may be not only all the user devices which are connected with a channel of network device 1, but also all the user devices which are connected with network device 1.

The release or initialization of the proper VPI is completed by a confirmation procedure similar to that for the initial allocation of VPI.

A network system as shown in FIG. 1 is based on the FTTC (Fiber To The Curve) in DAVIC (Digital Audio Video Council) 1.0 part 8. A mode of embodiment of the present invention according to FTTC is explained hereinafter.

User devices or customer premises equipment are supported by FTTC described in DAVIC 1.0 Part 8, wherein the network terminals which terminate the distribution cables outside the users' houses are passive. The network terminals 2 (NIT) connect maximum 4 user devices and branch telephone lines.

Network terminal (NT) 2 is connected channel by channel with network device 1. The maximum of user devices 3, 4, and 5 connected with network terminal (NT) 2 is four.

Network device 1 is provided with VPI allocation memory table 11 for memorizing the allocation of the VPI.

Figures 2, 3:
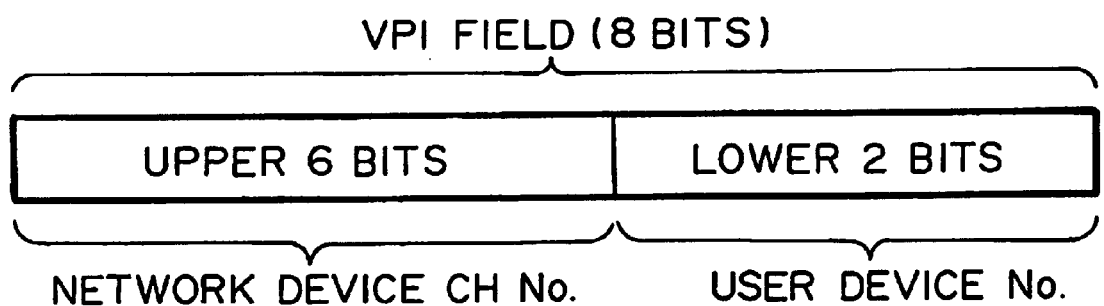
FIG. 2 is an example of VPI allocation memory table in network device included in the network system of the present invention.
FIG. 3 is a data frame for VPI allocation of the present invention.

An example of VPI allocation memory table is shown in FIG. 2. As shown in FIG. 2, VPI allocation memory table includes maximum four communication VPI values of 2 Bits (00–11) every channel of network device 1, and flags for indicating whether the proper VPI value is allocated or not. For example, when the flag is "0", the proper VPI of the user device connected with the corresponding channel is not allocated. On the other hand, when the flag is "1", the proper VPI of the user device connected with the corresponding channel is allocated.

Next, the communication VPI value is explained.

An example of the communication VPI value is shown in FIG. 3.

The communication VPI or proper VPI contains 8 Bits in the VPI field of the UNI (User Network Interface). The 8 Bits are divided into the upper 6 Bits and the lower 2 Bits. Here, the upper 6 Bits are used for identifying the channel (CH) number, while the lower 2 bits are used for identifying user devices 3, 4, and 5. The lower 2 Bits are the communication VPI value in the VPI allocation memory table 11. Therefore, the maximum of the channels becomes "64" and the maximum of user devices becomes "4".

Next, the operation of network device 1 is explained.

Network device 1 receives the ATM cell transmitted by user devices 3, 4, or 5. Then, network device 1 loads the communication VPI values of 00–11 (1–4 in decimal) on the information field of ATM. Then, network device 1 transmits toward user devices. 3, 4, or 5 the ATM cell with specific VPIIVCI containing the communication VPI. Thus, the communication VPI or proper VPI is initially allocated.

The specific VPIFVCI value in the header of the specific ATM cell may be, for example, "0" for the VPI and "21" temporarily for the VCI.

In this case, all the upper 6 Bits are zero in the ATM cells transmitted by network device 1. On the other hand, the upper 6 Bits of the ATM cell transmitted by user devices 3, 4, or 5 are the CH number of network device 1. Network device 1 discards both the ATMs cell with "0" VPI and "21" VCI and idle cells from user devices 3, 4, or 5.

Next, the operation of user devices 3, 4, and 5 is explained.

At first time, user devices 3, 4, or 5 communicates with network device 1 by using the ATM cell with "0" VPI and "21" VCI. Then, user devices 3, 4, or 5 employ the proper VPI memorized in cell filter 31, 41, or 51. Therefore, the memorized proper VPI values become their communication VPI values for accessing to network device 1. The ATM cells are received or discarded by user devices 3,4, or 5. on the basis of the memorized communication VPI.

Next, the procedure necessary for allocating and releasing the communication VPI is explained more concretely.

At first, the procedure necessary for allocating the communication VPI is explained.

VPI allocation memory table 11 is managed channel by channel and is rewritable. The VPI values 00–11 (1–4 in decimal) are memorized in the table 11.

At the initial set-up of user devices 3, 4, or 5, Sign-on defined in DAVIC 1.0 Part 8 is established between network device 1 and user device 3, 4, or 5. Then, user devices 3, 4, or 5 loads on the information field of the specific ATM cell the Device ID acquired from network device 1 at Sign-on. Then, user device 3, 4, or 5 request the allocation of the communication VPI value by transmitting the ATM cell with "0" VPI, "21" VCI and the Device ID.

Network device 1 detects the Device ID and decides 2 Bit proper VPI value to be allocated, referring to the proper VPI values already allocated and memorized in VPI allocation table 11. At this time, 00, 01, 10, and 11 are allocated in this order. Then, network device 1 responds to the request by transmitting towards user devices 3, 4, or 5 the ATM cell with "0" VPI, "21" VCI which are further loaded with the Device IDs and the newly allocated proper VPI values on the information field.

User device 3, 4, or 5 receives the ATM cell with "0" VPI, "21" VCI, confirms its own Device ID, and detects the newly allocated proper VPI loaded on the information field of the ATM cell. Thus, user device 3, 4, or 5 obtains its own communication VPI. Then, user device 3, 4, or 5 transmits an ATM cell with "0" VPI and "21" VCI in order to confirm the arrivals of the propre VPI or communication VPI. The confirmation message which notifies the arrival of the communication VPI is loaded together with the Device ID on the information field of the ATM cell. Here, A prescribed region of the ATM cell may be used as a data region for the arrival confirmation. Further, a prescribed 1 Bit in the ATM cell may be used for the arrival confirmation in such a manner that "1" stands for the arrival and "0" stands for the other case.

A series of procedures for the arrival confirmation are ended, when network device 1 transmits the ATM cell with "0" VPI and "21" VCI in response to the confirmation of arrival from user devices 3, 4, or 5, by inspecting the Device ID in the ATM cells with "0" VPI and "21" VCI from user device 3, 4, or 5. Here, a prescribed region of the ATM cell may be used as a data region for the response. Further, a prescribed 1 Bit in the ATM cell may be used for the response in such a manner that "1" stands for the arrival and "0" stands for the other case.

When the procedure for the arrival confirmation is ended, network device 1 memorizes the newly allocated communication VPI which are managed by a non-shown CPU in network device 1 and are recorded in a non-shown memory region in network device 1. The CPU also manages user devices 3, 4, and 5.

After completion of the arrival confirmation, user devices 3, 4, or 5 executes communication by using the newly allocated communication VPI which are managed by non-shown CPUs in user devices 3, 4, and 5, respectively and are recorded in non-shown memory regions in user devices 3, 4, and 5.

Next, the procedure for releasing the allocated communication VPI are explained again more concretely.

When user device 3, 4, or 5 in users' houses wants for some reasons to establish again the communication VPI, user device 3, 4, or 5 executes the following release procedure.

User device 3, 4, or 5 asks network device 1 for the release by using an ATM cell with "0" VPI and "21" VCI in the header. A prescribed region or a bit in the ATM cell may be used for the request of the release in the same way as in the arrival confirmation. At this step of procedure, all the user devices connected with the same channel of the network device 1 must be switched on or turned on.

When network device 1 receives the request from user device 3, 4, or 5, network device 1 initializes the communication VPI values in the relevant channel (CH) in VPI allocation memory table 11.

Then, network device 1 notifies user device 3, 4, or 5 of the initialization of VPI allocation memory table 11, by using the ATM cell with "0" VPI and "21" VCI. A prescribed region or a bit in the ATM cell may be used for the notification of the initialization.

Then, when user device 3, 4, or 5 receives the notification of the initialization from network device 1, user device 3, 4, or 5 lets network device 1 know that user device 3, 4, or 5 has received the notification, by using the ATM cell with "0" VPI and "21" VCI.

Network device 1 also notifies higher rank network device 6 of the release or initialization of the communication VPI values in the relevant channel. Thus, the communication VPI values restores the initial installation state.

It is not necessary to prepare in advance before installation the VPI values proper to network device 1 and user devices 3, 4, or 5, because in the network system of the present invention the proper VPI values are allocated after the installation of user devices 3, 4, and 5.

The specific VPI/VCI attached to the ATM cell for request and release of allocation may be any other values, although they are fixed to "0"/"21" as an example.

Nevertheless, "0" VPI is particularly suitable, because "0" VPI in the header is used for signaling in ATM communication.

What is claimed is:

1. An ATM network system comprising:

a network device; and a plurality of user devices, wherein said network device receives from one of said plurality of user devices a first specific ATM cell which has a specific VPI value and a specific VCI value in its header and is loaded in an information field with a device ID for identifying said one of said plurality of user devices and transmits, to said one of said plurality of user devices, a second specific ATM cell which has the specific VPI value and the specific VCI value in its header and is loaded with the device ID and a proper VPI value on an information field, and said one of said plurality of user devices acquires the device ID from the network device on first connection, transmits the first specific ATM cell after the first connection with said network device, receives the second specific ATM cell, and holds the proper VPI value as its own VPI value when the device ID loaded in the second specific ATM cell is confirmed to be the acquired device ID.

2. The ATM network system according to claim 1, wherein:

said user device includes a confirmation means for transmitting a third specific ATM cell which has the specific VPI value and the specific VCI value in its header, after holding its own VPI value, and for receiving a fourth specific ATM cell which has the specific VPI value and the specific VCI value in its header; and said network device includes a confirmation response means for transmitting a fourth specific ATM cell in response to the third specific ATM cell.

3. The ATM network system according to claim 2, wherein:

said one of said plurality of user devices includes an initialization means for initializing its own VPI value, wherein said initialization means transmits a fifth specific ATM cell which has the specific VPI value and the specific VCI value in its header and is loaded with an initializing request on an information field, and receives a sixth specific ATM cell which has the specific VPI value and the specific VCI value in its header; and said network device includes a transmission means for transmitting the sixth specific ATM cell in response to said fifth specific ATM cell.

4. The ATM network system according to claim 3, wherein:

said one of said plurality of user devices includes an initialization confirmation means for transmitting a seventh specific ATM cell which has the specific VPI value and the specific VCI value in its header and is loaded with said device ID for identifying said one of said plurality of user devices on an information field, after initializing its own VPI value, and for receiving an eighth specific ATM cell which has the specific VPI value and the specific VCI value in its header and is loaded with the device ID and the proper VPI value on an information field, and holds the proper VPI value sa its own VCI value when the device ID loaded in the eighth specific ATM cell is confirmed to be the acquired device ID; and said network device includes an initialization confirmation response means for transmitting the eighth specific ATM cell in response to the seventh specific ATM cell.

5. The ATM network system according to claim 3, wherein:
   a number of said plurality of user devices connected with a channel of said network device is limited within a prescribed number; and
   the proper VPI value is different from each other within a channel of said network device which transmits the first specific ATM cell.

6. The ATM network system according to claim 3, wherein said transmission means transmits in response to the fifth specific ATM cell the sixth specific ATM cell towards all of said plurality of user devices which are connected with a channel of said network device.

7. The ATM network system according to claim 6, further comprising:
   a plurality of network terminals which are connected with the network device by channels.

8. The ATM network system according to claim 1, wherein said network device has a VPI value allocation memory table which includes a plurality of communication VPI values for every channel of said network device, and flags for indicating whether the proper VPI value is allocated or not.

9. A VPI value allocation method for an ATM network system including a network device and a plurality of user devices, which comprises the steps of:
   an acquiring step for acquiring a device ID from said network device by one of said plurality of user devices on first connection to said network device;
   a first transmission step for transmitting, from said one of said plurality of user devices to said network device, a first specific ATM cell which has a specific VPI value and a specific VCI value in its header and is loaded with the device ID for identifying said one of said plurality of user devices on an information field;
   a second transmission step for transmitting, to said one of said plurality of user devices, in response to the first specific ATM cell, a second specific ATM cell which has the specific VPI value and the specific VCI value in its header and is loaded with the device ID and a proper VPI value on an information field; and
   a holding step for holding the proper VPI value as its own VPI value in said one of said plurality of user devices when the device ID loaded in the second specific ATM cell is confirmed to be the acquired device ID, after receiving the second specific ATM cell.

10. The VPI value allocation method for an ATM network system including a network device and a plurality of user devices according to claim 9, which further comprises the steps of:
    a third transmission step for transmitting a third specific ATM cell which has the specific VPI value and the specific VCI value in its header for notifying an arrival of said proper VPI value, from said one of said plurality of user devices to said network device;
    a fourth transmission step for transmitting in response to the third specific ATM cell a fourth specific ATM cell which has the specific VPI value and the specific VCI value in its header, and
    a receiving step for receiving the fourth specific ATM cell at said one of said plurality of user devices.

11. The VPI value allocation method for an ATM network system including a network device and a plurality of user devices according to claim 10, which further comprises said steps of:
    a fifth transmission step for transmitting, from said one of said plurality of user devices to said network device, a fifth specific ATM cell which has the specific VPI value and the specific VCI value in its header and is loaded with an initializing request on an information field for requesting an initialization of the proper VPI value;
    a sixth transmission step for transmitting from said network device to said one of said plurality of user devices a sixth specific ATM cell which has the specific VPI value and the specific VCI value in its header for permitting the request, in response to the fifth specific ATM cell; and
    an initializing step for initializing the proper VPI value held by said one of said plurality of user devices.

12. The VPI value allocation method for an ATM network system including a network device and a plurality of user devices according to claim 11, which further comprises the steps of:
    a seventh transmission step for transmitting a seventh specific ATM cell which has the specific VPI value and the specific VCI value in its header and is loaded with the device ID for identifying said one of said plurality of user devices on an information field for notifying an execution of said initialization, from said one of said plurality of user devices towards said network device, after said initializing step;
    an eighth transmission step for transmitting in response to the seventh specific ATM cell an eighth specific ATM cell which has the specific VPI value and the specific VCI value in its header and is loaded with the device ID and the proper VPI value on an information field from said network device to said user device; and
    a receiving step for receiving the eighth specific ATM cell at said user device.

13. The VPI allocation method for an ATM network system including a network device and a plurality of user devices according to claim 11, wherein in said sixth transmission step, said network device transmits in response to the fifth specific ATM cell the sixth specific ATM cell towards all of said user devices which are connected with a channel of said network device.

14. The VPI value allocation method for an ATM network system including a network device and a plurality of user devices according to claim 13, wherein a plurality of network terminals are connected with the network device by a channel.

15. The VPI value allocation method for an ATM network system including a network device and a plurality of user devices according to claim 9, wherein:
    a number of said one of said plurality of user devices connected with a channel of said network device is limited within a prescribed number; and
    the proper VPI value is different from each other within a channel of said network device.

16. The VPI value allocation method for an ATM network system including a network device and a plurality of user devices according to claim 9, wherein said network device has a VPI value allocation memory table which includes a plurality of communication VPI values for every channel of said network device, and flags for indicating whether the proper VPI value is allocated or not.

17. A VPI value allocation method for an ATM network system including a network device and a plurality of user devices, which comprises the steps of:

a connection step for connecting said network device and one of said plurality of user devices;

acquiring step for acquiring a device ID on first connection from one of said plurality of user devices to said network device;

a sharing step for holding said VPI value in common by communication between said network device and said one of said plurality of user devices using an ATM cell which has a specific VPI value and a specific VCI value in its header and is loaded with the device ID for identifying said one of said plurality of user devices on an information field; and an initializing step for initializing the VPI value using another ATM cell which has the specific VPI value and the specific VCI value in its header and is loaded with the device ID for identifying said one of said plurality of user devices on an information field.

* * * * *

UNITED STATES PATENT AND TRADEMARK OFFICE
CERTIFICATE OF CORRECTION

| | |
|---|---|
| PATENT NO. | : 6,934,291 B1 |
| DATED | : August 23, 2005 |
| INVENTOR(S) | : Yoshinori Rokugo et al. |

It is certified that error appears in the above-identified patent and that said Letters Patent is hereby corrected as shown below:

Column 9,
Line 4, change "sa" to -- as --.

Signed and Sealed this

Tenth Day of January, 2006

JON W. DUDAS
*Director of the United States Patent and Trademark Office*